United States Patent [19]

Matoni

[11] Patent Number: 5,095,788
[45] Date of Patent: Mar. 17, 1992

[54] METHOD FOR COMPENSATING THERMALLY INDUCED DISPLACEMENT IN MACHINE TOOLS

[75] Inventor: Michael Matoni, Starnberg, Fed. Rep. of Germany

[73] Assignee: MTU Motoren-ünd Turbinen-Union Munchen GmbH, Munich, Fed. Rep. of Germany

[21] Appl. No.: 427,331

[22] Filed: Oct. 25, 1989

[30] Foreign Application Priority Data

Oct. 25, 1988 [DE] Fed. Rep. of Germany ....... 3836263

[51] Int. Cl.⁵ .................. G06F 15/00; B23B 3/00
[52] U.S. Cl. .................................. 82/118; 82/120; 364/474.34; 364/474.37
[58] Field of Search .............. 318/568, 572; 364/474.34–474.35, 474.36, 474.37; 82/1.11, 117, 118–119, 120

[56] References Cited

U.S. PATENT DOCUMENTS

| | | | |
|---|---|---|---|
| 4,281,385 | 7/1981 | Nakaso | 364/474.34 |
| 4,562,392 | 12/1985 | Davis | 364/474.34 |
| 4,583,159 | 4/1986 | Kanemoto | 364/474.34 |
| 4,636,960 | 1/1987 | McMurtry | 364/474.35 |
| 4,653,360 | 3/1987 | Comptor | 82/118 |
| 4,761,891 | 8/1988 | Sugimura | 82/118 |
| 4,818,925 | 4/1989 | Lahm | 364/474.34 |

Primary Examiner—Bruce M. Kisliuk
Assistant Examiner—John A. Marlott
Attorney, Agent, or Firm—Ladas & Parry

[57] ABSTRACT

A method for compensating thermally induced displacement between a workpiece clamped for machining relative to a tool arranged on a tool holder of an automatically controlled machine tool, such as a lathe, where use is made of mechanical sensors to sense and correct deviations between programmed and actual tool positions relative to the workpiece. With the workpiece clamped in place, a mechanical workpiece sensor clamped in a work holder is adjusted to make mechanical contact with the workpiece in the actual position in which the workpiece is to be machined or has been previously machined. Adjustment to a thermally compensating position of a tool measuring device coupled to a mechanical tool sensor is made via the adjusted mechanical workpiece sensor.

3 Claims, 4 Drawing Sheets

METHOD FOR COMPENSATING THERMALLY INDUCED DISPLACEMENT IN MACHINE TOOLS

FIELD OF THE INVENTION

This invention relates to a method for compensating thermally induced displacement in machine tools.

BACKGROUND AND PRIOR ART

Machine tools, more particularly lathes, are subject to thermal expansion of the machine system, causing the datum or zero positions of the spindle (workpiece), a tool measuring device and a tool holder, to drift relative to each other. In combination the various drift movements result in improper tool positions relative to the workpiece. This produces positional errors in an amount up to and occasionally exceeding 100 μm.

This requires the machine operator to readjust the tool position repeatedly. Additionally measurements and test cuts must be made, and if necessary, data from prior experience must be entered in the calculation of the readjusted position.

The master elements conventionally used for calibration must be mounted to run with the requisite degree of accuracy on the spindle of the machine tool which requires a comparatively great setup effort (changing the setup and positioning) plus time-consuming calibration work, all of which are associated sources of error.

DE-PS 35 30 567 discloses a method and device for mechanically sensing the tool position in which a reference column is attached directly to the lathe to eliminate the need for mounting a reference ring in the chuck, the reference column being resiliently arranged on the machine in a calibrated position relative to the workpiece. In this arrangement, ultrasonic vibrations can be produced in the reference column, and an accelerometer arranged on the turret of the respective lathe responds to the vibrations when a tool acting as a mechanical sensor comes into contact with the reference column. The accelerometer ouput signal is then transmitted from the turret by a rotary coupling, the signal is treated and then is applied to a numerical control unit for use either in calibration or in the measurement of parts being machined.

The above arrangement seeks to provide improvements in the measuring of test cuts by using the respective tool and no other means to measure the test cuts in all positions. In the measurement of the workpiece, however, there is assumption of an actually existant firm and rigid zero position, so that corrections of the positions of the tool tip are influenced by error induced by thermal drift, so that this arrangement cannot obviate the need for test cuts.

SUMMARY OF THE INVENTION

An object of the present invention is to provide methods in which the disadvantages of the prior art are eliminated and an extremely simplified method and means are developed for compensating thermally induced zero shift which substantially eliminates the need for operator intervention in the machining cycle.

In accordance with the invention, a workpiece is secured in a determined position on a spindle, a mechanical workpiece sensor is mounted in a tool holder and is moved so that the workpiece sensor contacts the workpiece in a reference position representing the actual position of the workpiece, a tool sensor is adjusted in position by a control means based on the reference position of the workpiece sensor, the workpiece sensor is replaced by a machining tool and the position of the machining tool in its actual machining position is established on the basis of the adjusted position of the tool sensor.

In the method of the present invention, therefore, no absolute stationary zero position or absolute stationary reference surface exists, and no correction is therefore made relative to an "absolutely correct" position. The invention instead relies on creating relative agreement between the zero positions of the spindle, the tool measuring device and the tool holder. In other words, the invention provides for measurement and correction of the respective amounts of machine drift.

The invention provides an automatically controlled machining cycle requiring no operator intervention for readjustment within a manufacturing tolerance range of $\geq 30$ μm.

In accordance with the present invention, therefore, the need for test cuts which constitutes a disadvantage that generally adversely affects the present state of the art, is eliminated, and also eliminated with it is the need to measure those test cuts and to scrap or rework workpieces because of attendant errors.

In accordance with the present invention, therefore, the workpiece being machined, or the finish machined workpiece, constitutes the master element. In an advantageous aspect of the present invention, therefore, a shift due to thermally caused component drift (ambient conditions) can be sensed and corrected before metal is actually cut. Accordingly, this obviates the need for test cuts.

The method of the present invention can be randomly carried out or repeated in the respective machining process, so that the temperature effects associated with the machining operations on the workpiece which cause shift of the datum or zero positions can continuously be considered.

Compensation is achieved without operator intervention, especially since a replacement of the machining tool by a mechanical sensor and vice versa is automatically effected by the machine.

DETAILED DESCRIPTION OF A PREFERRED EMBODIMENT

The invention is directed to the optimization of machining operations especially on axisymmetric workpieces such as inner or outer surfaces of axisymmetric recesses. The article to be machined can generally have any random contour, for example, when it is desired to machine a cylindrical internal recess in this article.

Figure 1:
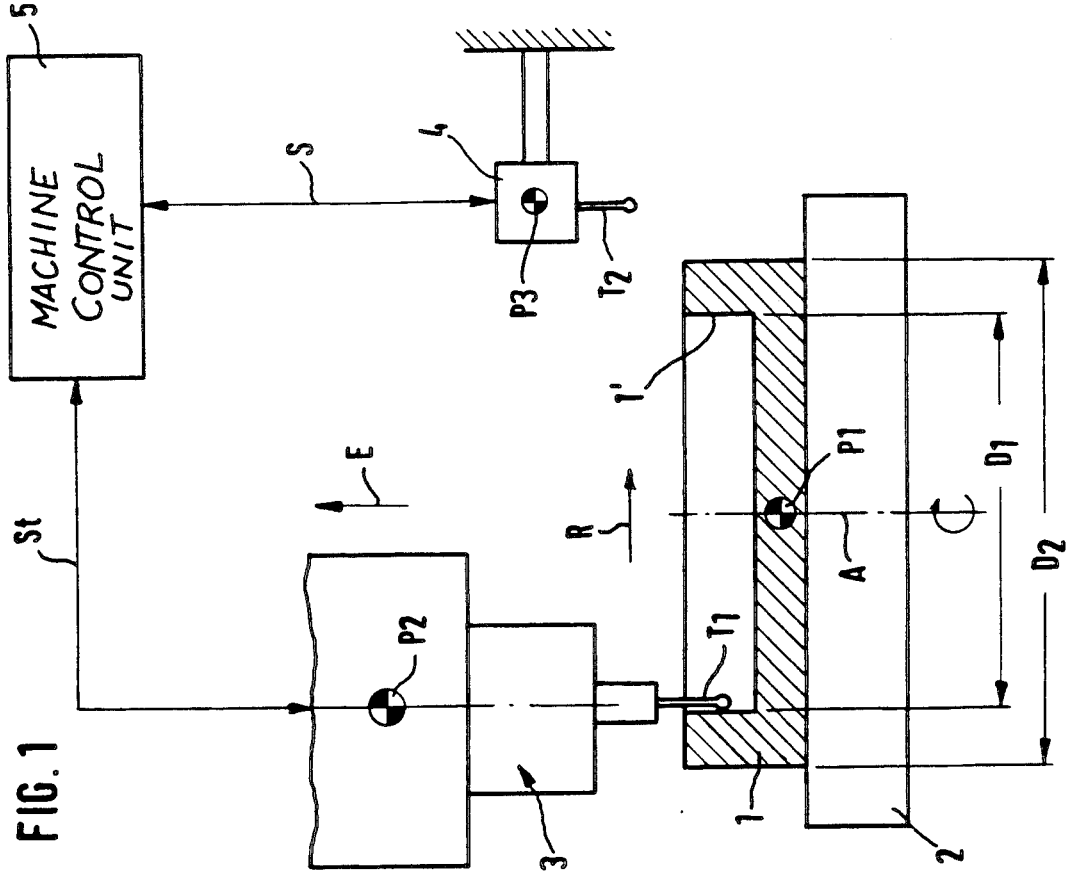
FIG. 1 is a schematic illustration of a lathe with control and measuring means, including a workpiece spindle, a tool and tool holder, and a workpiece measuring device showing datum or zero positions therefor.

The invention will be described with reference to the manufacture of a cylindrical component 1 having a concentric cylindrical recess 1' as shown in FIG. 1. The component 1 is secured for rotation to a lathe spindle 2 by a chuck (not shown). A center line of the component 1 coincides with the axis of rotation of the spindle 2 and is designated by reference character A.

In FIG. 1 there is seen a tool holder 3 forming part of the machine, a tool measuring device 4, and a machine control unit 5.

Figure 2:
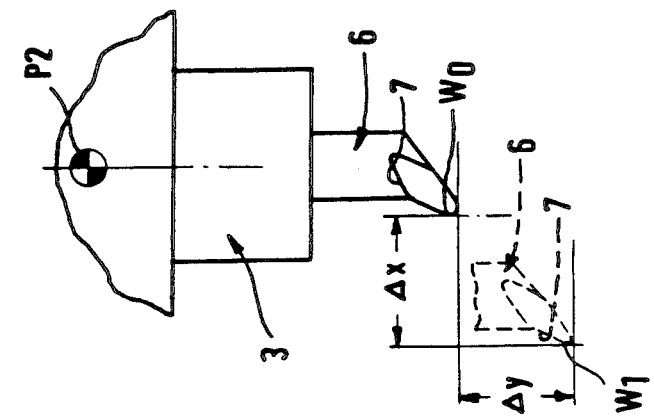
FIG. 2 is a side view, with parts broken away, of the tool holder in FIG. 1, but now with the tool gripped in the holder in a first preset position (initial setpoint $W_0$) and a new present position (new setpoint $W_1$) of the tool holder due to thermal drift.
Figure 3:
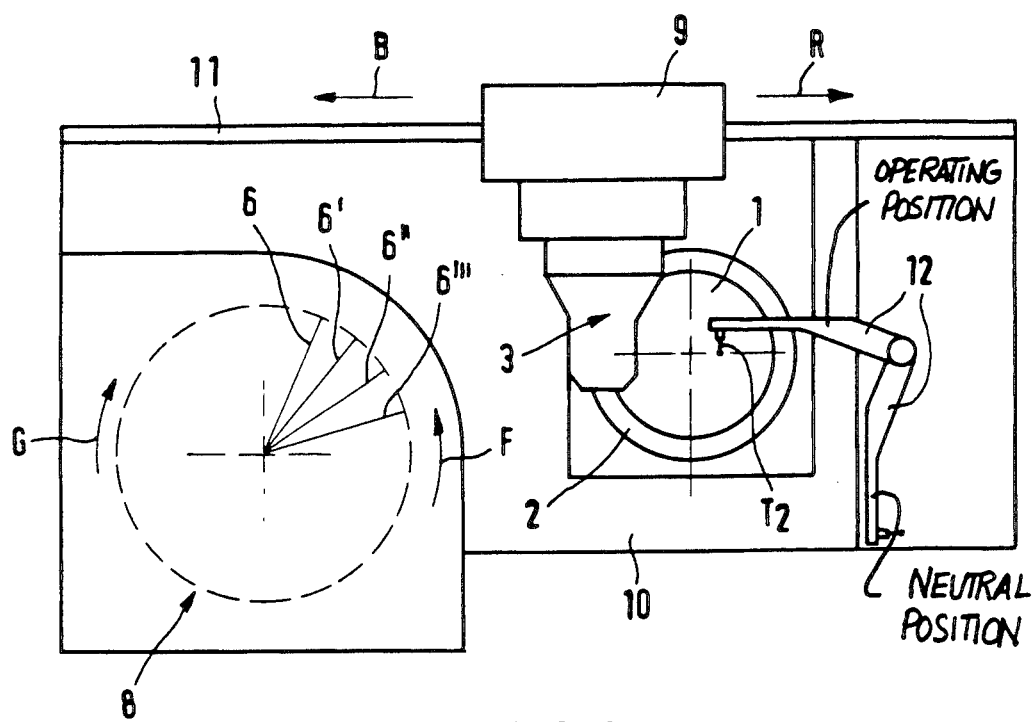
FIG. 3 is a schematic top plan view of the lathe in FIG. 1 with a tool magazine and an arm for moving a mechanical tool sensor between neutral and operating positions.

The inner wall of the recess 1' is machined by a metal cutting tool 6 (FIG. 2) which is clamped in the tool holder 3, the tip contour of the tool 3 being designated by numeral 7. Referring to FIG. 3, therein is seen a rotary magazine 8 carrying various tools 6, 6', 6", 6"', etc. to suit the respective local machining operations. The magazine 8 is rotatable to different angular positions so that a particular tool can automatically be indexed and picked by the tool holder 3 to be brought to the workpiece. For this purpose, the tool holder 3 can slide in the direction of arrow B by means of a carriage 9 movable along a rail 11 anchored on the machine base 10 to pick up the tool and then reverse itself in the direction of arrow R to bring the tool to the workpiece. The magazine 8 is rotatable in opposite directions F and G to bring the selected tool into position to be picked up by the tool holder 3.

A basic problem affecting the present invention is that a lathe of the type schematically illustrated in FIGS. 1 and 3, is subject to thermal expansion of the machining system, which causes drift of the respective datum or zero positions of the workpiece 1, the tool holder 3, and the measuring device 4 designated hereafter respectively as zero positions or points $P_1$, $P_2$ and $P_3$. In an essential aspect of the present invention, the measuring device 4 plus an associated mechanical tool sensor $T_2$ is involved in the compensation method described more fully below.

If there is departure from preset values entered in the respective computer-aided machine control 5 for machining the component 1, therefore, even the slightest of positional changes in the zero positions P1, P2 absolutely or relative to each other, cause errors in relative position, and thus in machining the workpiece. These positional changes are compensated in a comparatively simple manner by the method of the invention. This will be explained hereafter.

Assume $D_1$ and $D_2$ in FIG. 1 represent the respective inner and outer diameters of workpiece 1 to be machined and these are programmed as specified diameters in control unit 5. Thermally induced drift in the machining system would cause the workpiece to be machined improperly (actual values) and therefore, due to the shift of zero position P2 (tool holder 3) relative to zero position $P_1$ of the workpiece, it is necessary to readjust the selected position of the tool holder 3 and tool 6 relative to the machining diameters $D_1$ and $D_2$ (actual values). The relative thermal drift is schematically shown in FIG. 2 by $\Delta X$ in a horizontal direction, i.e. between tip 7 of the tool 6 and the workpiece 1 and by $\Delta Y$ which represents the relative axial thermal drift in the direction of the axis A, i.e. of the tip 7 of tool 6 relative to the workpiece 1. The thermal drift must be considered in the machining or manufacturing of the workpiece.

For compensation of the thermally induced shift of the zero positions P1, P2 and P3, a mechanical workpiece sensor $T_1$ is automatically inserted in the tool holder 3 in replacement of tool 6 (with the component 1 secured to the spindle 2) and where the mechanical workpiece sensor $T_1$ is in the preset position $W_0$ in FIG. 2. The mechanical workpiece sensor $T_1$ is adjusted to the actually existing zero position (P1) by adopting the sensor $T_1$ to the actual position of the component 1, for example, by mechanically contacting the inner wall of an existing or previously machined recess 1' to produce a new preset value $W_1$ of the tool holder 3 as shown in FIG. 2. Thereafter the zero position P3 of the tool measuring device 4 with the mechanical tool sensor $T_2$ is adjusted to a new preset value $Ww_z$ (cf. FIG. 4) based on the adjustment of mechanical workpiece sensor $T_1$ from $W_0$ to $W_1$. To effect this last zero adjustment, the mechanical workpiece sensor $T_1$ is moved out of the recess 1' by means of the tool holder 3 in the direction of arrow E parallel to axis A, and is then moved in the direction of arrow R (cf. FIG. 1) towards the mechanical tool sensor $T_2$ to make mechanical contact therewith. The adjusting processes are randomly repeatable, two or more times as needed, normally in the case of precision adjustment movements of the respective mechanical sensors $T_1$, $T_2$ to compensate for positional errors of approximately 100 $\mu$m and above.

For precision adjustment, use can be made of miniaturized electromechanical geared drive means optionally integrated into the tool holder 3 and also into the measuring device 4 or arm 12 (FIG. 3) supporting the mechanical tool sensor $T_2$.

With refrence now to FIG. 3 the arm 12 can be pivoted from its neutral position located away from the workpiece into an operating position where the mechanical tool sensor $T_2$ comes to rest in a parallel position above the workpiece 1 so that contact can be made with tool sensor $T_1$ by movement of the latter in the direction of arrow R without interference from the workpiece.

After the zero position P3 of the tool measuring device and mechanical tool sensor $T_2$ has been adjusted to $Ww_z$, the mechanical workpiece sensor $T_1$ is automatically replaced by a tool 6, 6', 6" or 6"'... in the tool magazine 8 (FIG. 3) (by movements in the direction of arrows B, or G and F, respectively) as previously explained. Before machining commences, the newly installed tool 6, 6', 6"...is moved in the direction R up against the mechanical tool sensor $T_2$ in its operative and adjusted position to position the tool which replaced $T_1$ on the basis of the position $Ww_z$ of the mechanical tool sensor $T_2$ in its corrected position for compensating thermally induced positional variation (disturbance variable Z - FIG. 4).

In the method described above, it is assumed that the tool magazine 8 is loaded with one or more on-call mechanical workpiece sensors $T_1$ as well as tools 6, 6', etc. suitably selected or prepared for changing.

As diagrammatically indicated in the schematic arrangement in FIG. 1, the tool measuring device 4 is connected to the machine control 5 through a signal transmission line S. Device 4 basically generates measured variables as a function of setpoints received (old preset value $T_2$) on the one hand and as a function of actual positions received (new preset value $S_1$) on the other hand.

The schematic connection St in FIG. 1 represents an electrohydraulic coupling between the machine control 5 and the tool holder 3 which is designed so that electric output signals from the control 5 for the positional adjustment of the tool holder can be translated into hydraulic actuation of the tool holder 3 by suitable follower means. The signal connection St also schematically characterizes the coupling between tool holder 3 and machine control 5 to provide the "old" and the "new" preset positions $W_0$ and $W_1$, respectively (cf. FIG. 4).

In a step-by-step summary, then, the sequence for the compensation method in accordance with the present invention is as follows:
  automatic loading of the mechanical workpiece sensor $T_1$ in the tool holder 3;
  calibration or adjustment of the mechanical workpiece sensor $T_1$ by bringing it into mechanical contact with the workpiece 1 and hence in relation with its actual zero position;
  zero position adjustment of the tool measuring device 4 through the previously adjusted mechanical workpiece sensor $T_1$ relative to the thermally induced positional deviation determined by the latter;
  automatic replacement of the mechanical workpiece sensor $T_1$ on the tool holder 3 with the tool 6;
  adjustment of the position of tool 6 relative to the tool measuring device 4 previously corrected for thermally induced positional deviation; and continuation of the programmed machining cycle.

Figure 4:
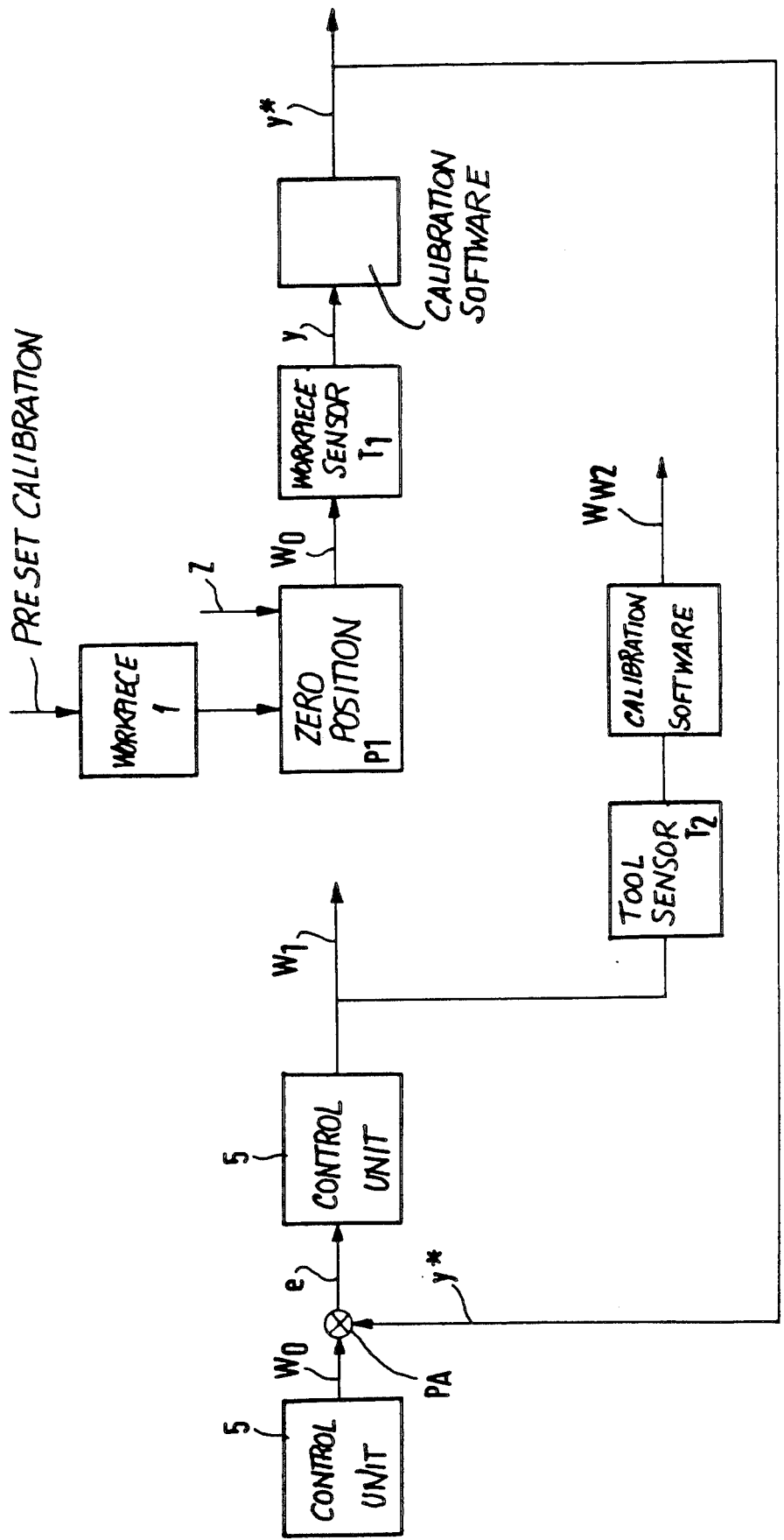
FIG. 4 is a block diagram illustrating the steps of the method of the present invention.

The invention is described more fully hereafter with reference to FIGS. 1 and 2 in conjunction with the schematic control diagram of FIG. 4. With reference first to FIGS. 1 and 2 let $W_1$ be the initial preset value from the machine control 5 for the position of the tool 6 relative to the workpiece 1. In accordance with FIG. 4, then, the disturbance variable Z (thermal drift $\Delta X$, $\Delta Y$) shifts the zero position P1 of the workpiece 1 relative to the initial preset value $W_0$ from the machine control 5. By making mechanical contact with the inner wall of the recess 1' of the workpiece, the mechanical workpiece sensor $T_1$ on the tool holder 3 senses the actual value of the zero position and so identifies the displaced position (actual value) of the zero position P1 of the workpiece; this information becomes Y. The information (actual value) is fed to the calibration software of a data processing system (computer) associated with the machine to process the input information Y into a value $Y^*$ = actual value corrected by the disturbance variable Z (thermal drift). In accordance with the signal flow described above, the corrected actual value $Y^*$ is fed back to the machine control unit 5 through the add point PA and computed from the offset e to form the new preset value $W_1$ (cf. FIG. 2) from the initial or old preset value $W_0$, the new value $W_1$ being the controlling value for the control of the tool holder 3. In order to ensure the new preset value $W_1$ of the tool holder 3 for one or several tools 6, 6' or 6", etc. (FIG. 3) substituted for the mechanical workpiece sensor $T_1$ for machining purposes, by way of the previously mentioned adjustment of the zero position P3 of the tool measuring device 4 with the mechanical tool sensor $T_2$ via the mechanical workpiece sensor $T_1$ (by contact of $T_1$ and $T_2$), $W_1$ is applied by special machine-integrated calibration software to the original preset value relative to the position of the mechanical tool sensor $T_2$; from which the new preset value $W_{wz}$ is determined relative to the position of the mechanical tool sensor $T_2$. This adjustment can take place at any point in time and is triggered as a function of disturbance variable Z (thermal drift) as soon as a certain, empirically derived threshold is crossed. In the absence of the disturbance variable Z, the specified and actual values would match ($W_0 = Y = Y^*$, or $W_0 = W_1$ or $W_{wz}$), so that $W_0$ would naturally not need correcting.

Figure 5:
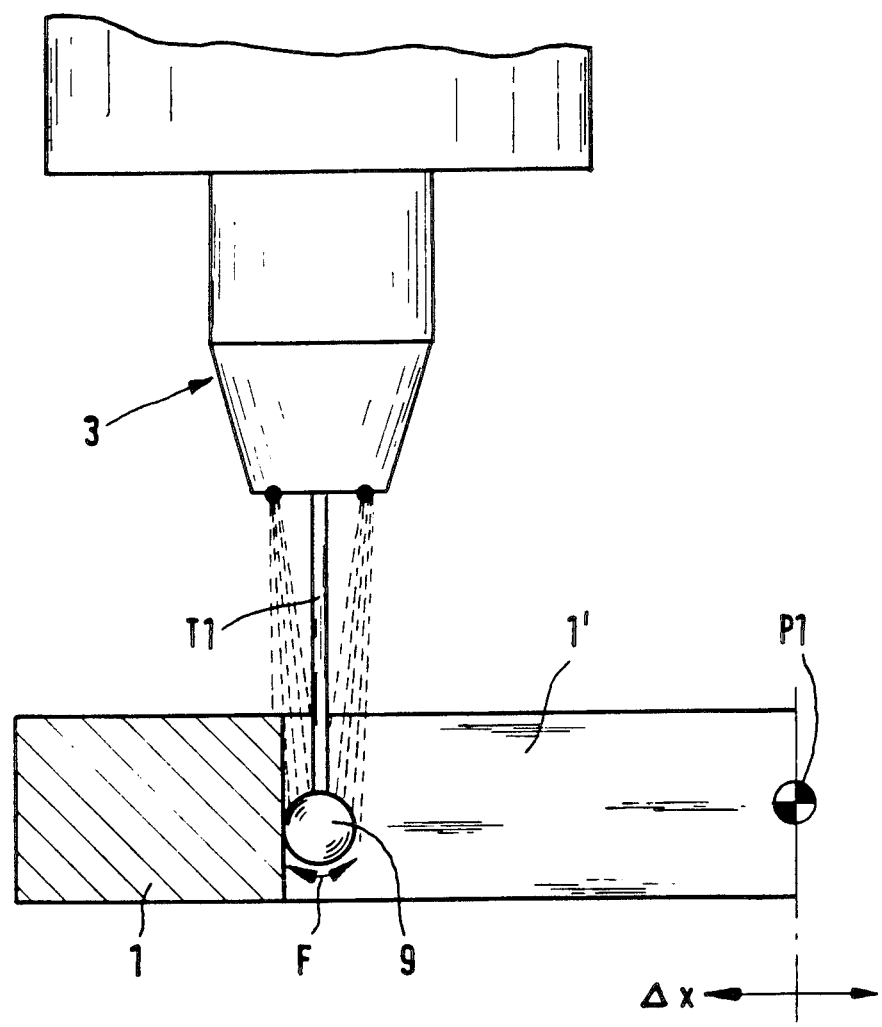
FIG. 5 illustrates a mechanical workpiece sensor relative to a section of the workpiece being machined showing associated sensor deflection.

Illustrated in FIG. 5 is an arrangement for sensing and measuring the workpiece 1 by a mechanical-electrical workpiece sensor $T_1$. The workpiece sensor $T_1$ can readily be clamped into position in the tool holder 3 of the lathe shown in FIGS. 1 and 3 and coupled to the tool measuring device 4 as a data generator by wired or nonwired (telemetric) connection. The mechanical sensor system is preferably actuated in a manner suitable also for automatic applications in automatic tool changing arrangements. The actuating signal is generated by mechanical deflection of the mechanical workpiece sensor $T_1$ as illustrated in FIG. 5 by the double arrow F, where the sensor $T_1$ deflects through a certain angle when contacting the workpiece 1. Assuming that the workpiece 1 is firmly secured to the lathe spindle and in the course of time has been displaced by $\Delta x$ due to thermal effects prior to the combined adjustment-calibration process, the deflection of the sensor, i.e. the deflection of ball 9 at the end of the mechanical workpiece sensor $T_1$, can be corrected, depending on the pretension and as a function of length and modulus of elasticity of the sensor $T_1$, by applying the correcting value to the measured value. The mechanical tool sensor $T_2$ (FIG. 1) can be designed in the same manner.

The sensor in FIG. 5 has nozzles $N_1$ and $N_2$ located on opposite sides of ball 9 for spraying a fluid (liquid or gas) onto the ball prior to a measuring operation (contact with workpiece 1 in FIG. 5) for cleaning or cooling purposes.

In respect of the mechanical sensor configurations described especially with reference to FIG. 5, the means used for the transmission of signals can optionally be inductive or based on IR radiation. Since these means are conventional in the art, they are not described more fully.

The method of the present invention can be applied at any time during the machining process, with no need to change the setup or refit calibration workpieces on the spindle, which helps working to very close tolerances in both unit and mass production. The invention therefore provides a low cost and flexible method that satisfies the most stringent quality requirements and improves machine utilization. Another vital advantage of the inventive process is that it greatly reduces the setup time.

Although the invention has been described in relation to specific embodiments thereof, it will become apparent that numerous modifications and variations can be made by those skilled in the art without departing from the scope and spirit of the invention as defined in the attached claims.

What is claimed is:

1. A method of compensating thermally induced relative displacement between a programmed position and an actual position of a machining tool supported in a tool holder relative to a workpiece, said method comprising securing a workpiece in a determined position, mounting a mechanical workpiece sensor in a tool holder, moving the tool holder so that the workpiece sensor contacts the workpiece at a reference position, adjusting the position of a tool sensor to correspond to said reference position of the workpiece sensor by bringing said tool sensor into contact with said workpiece sensor with the workpiece sensor in said reference position, replacing the workpiece sensor with a machining tool, and establishing the position of the machining tool relative to said reference position of the tool holder based on the adjusted position of the tool sensor by contacting the tool with the tool sensor, with the latter in the adjusted position thereof corresponding to said reference position.

2. A method of compensating thermally induced shift of a workpiece held for machining relative to a tool mounted in a tool holder on an automatically controlled machine tool, said method comprising sensing and correcting variations between a programmed position and an actual position of a tool relative to a workpiece by the steps of clamping the workpiece to a spindle in a determined position, securing a mechanical workpiece sensor in a tool holder, positionally adjusting the sensor until the sensor makes contact with the workpiece to detect the actual working position of the workpiece and effecting adjustment of a tool measuring device coupled to a tool sensor based on the positionally adjusted workpiece sensor the workpiece sensor being initially in a set position $W_0$;

the workpiece sensor being positionally adjusted to a new position $W_1$ in response to relative displacement of the workpiece and the tool holder by bringing the workpiece sensor into contact with the workpiece;

the tool sensor being positionally adjusted to a new preset value $W_{wz}$ when the workpiece sensor is adjusted to its new position $W_1$ by contact with the tool sensor;

replacing the workpiece sensor in the tool holder by a tool;

positionally adjusting said tool by contacting the same with the tool sensor adjusted to the new preset value $W_{wz}$; and continuing a programmed machining operation.

3. A method as claimed in claim 2 comprising incorporating the compensation of thermally induced zero shift of said spindle, said tool measuring device and said tool holder and further relying on creating relative agreement between actual positions resulting from said zero shift.

* * * * *